United States Patent [19]

Spence

[11] Patent Number: 4,772,816

[45] Date of Patent: Sep. 20, 1988

[54] ENERGY CONVERSION SYSTEM

[75] Inventor: Geoffrey M. Spence, Crowborough, United Kingdom

[73] Assignee: Energy Conversion Trust, Crowborough, United Kingdom

[21] Appl. No.: 923,797

[22] PCT Filed: Feb. 7, 1986

[86] PCT No.: PCT/GB86/00067

§ 371 Date: Oct. 14, 1986

§ 102(e) Date: Oct. 14, 1986

[87] PCT Pub. No.: WO86/04748

PCT Pub. Date: Aug. 14, 1986

[30] Foreign Application Priority Data

Feb. 12, 1985 [GB] United Kingdom ................. 8503499

[51] Int. Cl.⁴ ........................ H02N 7/00; H02K 44/00
[52] U.S. Cl. ........................................ 310/306; 310/11
[58] Field of Search ............................ 310/306, 10, 11

[56] References Cited

U.S. PATENT DOCUMENTS

| | | | |
|---|---|---|---|
| 1,717,413 | 6/1929 | Rudenberg | 310/306 X |
| 3,202,844 | 8/1965 | Hatch | 310/306 |
| 3,234,411 | 2/1966 | Klein | 310/306 |
| 3,312,840 | 4/1967 | Gabor | 310/306 |
| 3,393,330 | 7/1968 | Vary | 310/306 |
| 3,899,696 | 8/1975 | Shimadu | 310/306 |

Primary Examiner—Mark O. Budd
Attorney, Agent, or Firm—Charles E. Pfund

[57] ABSTRACT

The apparatus uses a magnetic field (80) to accelerate a charged particle radially towards a target electrode (10). The increased kinetic energy of the particles enables the particle to give up more electrical energy to the target electrode (10) than was initially given to it. This charges the target electrode (10), and the increased energy is extracted from the apparatus by connecting an electrical load between the target electrode and a point of lower or higher potential.

29 Claims, 5 Drawing Sheets

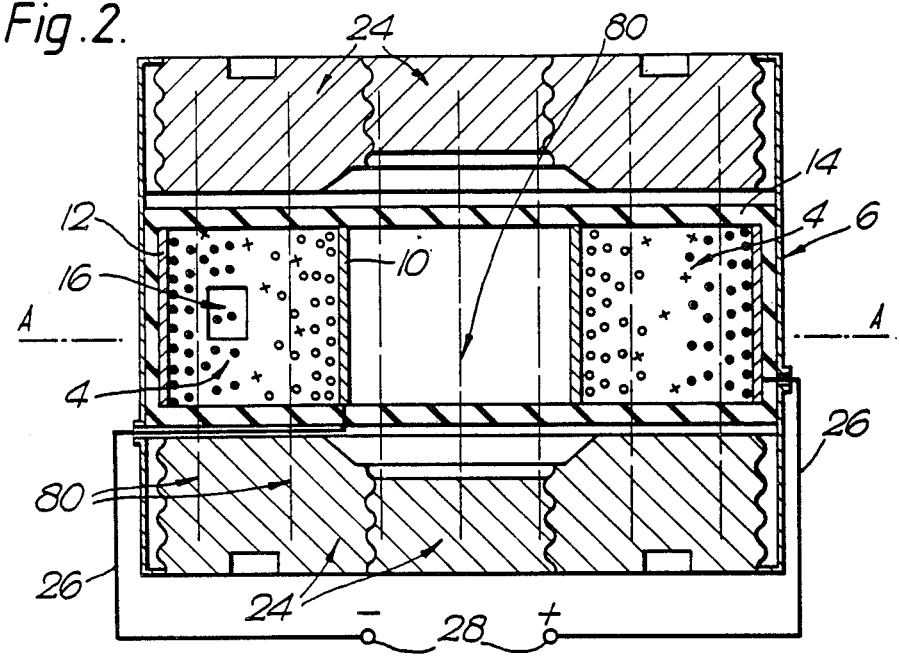
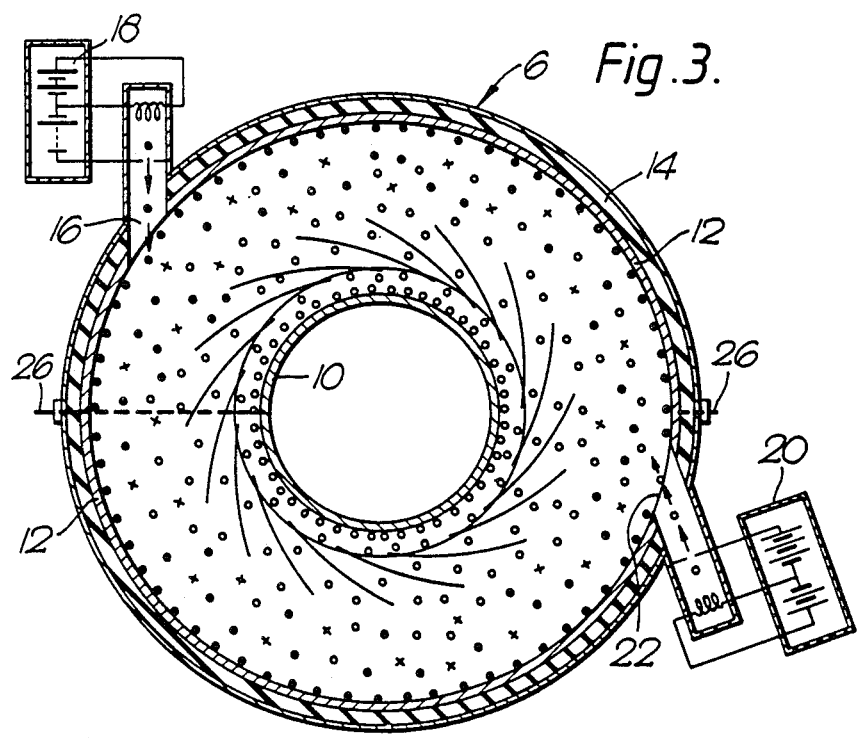

ENERGY CONVERSION SYSTEM

This invention relates to a process and apparatus for generating a potential difference between two or more electrodes and using charged particles as energy carriers.

Electrical power is usually generated by burning a fossil fuel and converting the energy released into rotary motion which drives electrical generators. This is cost-effective only if carried out on a large scale, the conversion process being inefficient; utilising natural resources, and producing waste products which can cause serious environmental pollution. An additional disadvantage is that the electrical power cannot be supplied directly to road vehicles or ships.

The energy-conversion process of this invention involves no health or pollution hazard and generates electrical power directly by a single-stage process without waste products. The overall energy-conversion factor and power-to-weight ratio are both high, making the apparatus suitable for most fixed and mobile applications.

One known apparatus for doing useful work by operating on electrons with a magnetic field is called the "betatron". This includes a doughnut-shaped vacuum chamber between the poles of a specially-shaped electromagnet. Thermionically-produced electrons are injected into the chamber with an initial electrostatic energy of about 50 keV. As the magnetic field builds up during its positivegoing half-cycle, it induces an electromotive force within the doughnut, which force accelerates the electrons and forces them to move in an arcuate path, by interaction with the magnetic field. An important distinction between the betatron and the energy cnverter of this invention is that in the former the magnetic field has got to be able to increase over a very short period, in order to accelerate the electrons sufficiently, whereas in the latter the magnetic field is virtually constant and the electrons fall inwardly to give up both their kinetic energy and electric charge to a central electrode.

The present invention aims at providing an energy converter which may be mobile and which has a permanent magnet or an energised source of magnetic radiation associated with it in order to amplify the electrical energy initially imparted to charge particles fed to, or produced in, a so-called "vacuum" chamber forming part of the generator, which increased energy is extracted from the target electrode on which the particles are incident.

Accordingly the present invention provides an energy converter which is as claimed in the appended claims.

While the invention is not to be limited to any particular theory of operation, it is based on the fact that, when a charged particle is constrained to move through a radial distance d (irrespective of the path which it actually follows) through a magnetic field of intensity H, the work done on the particle is H.d. For an electron carrying a charge e, and moving at a speed v over distance d, the total force on the electron is the centripetal force $\Sigma H.e.v$, less the force exerted on the electron in the opposite direction by the centrifugal force, which is $\Sigma mv^2 r^{-1}$. By making the radius of the centre electrode appreciably greater than the orbit of equilibrium, the centrifugal force can be minimised, thus maximising the centripetal force, and hence the work done in bringing the charge to the electrode.

The process by which the converter of this invention works uses, as a source of charge, electrically-charged particles, for example electrons and/or ions. Two or more electrodes are housed in a low-pressure chamber. A magnetic field as specified below traverses the chamber: it emanates from a permanent magnet, electromagnet or a source of magnetic radiation. An external source of energy is used to give the charge particles initial kinetic energy, for example by heating, acceleration through an electric field, or from nuclear radiation. The energy-conversion process uses the magnetic field to transfer the charged particles along a desired orbit until they impinge on a central electrode (cathode). The work done on the particles (therefore the electrical potential attained by the cathode) is proportional to the resultant magnetic force times the distance over which the force acts. As the particles move within the chamber they cross the magnetic field. This produces a force acting on the particles, the force being proportional to the field strength, speed and electrical charge of the particles, and the sine of the angle of incidence between the path of the particle and the magnetic lines of force. This force has an angular component and a centripetal one, which forces the particles to travel along a spiral orbit.

An opposing centrifugal force also acts on the particles in opposition to the centripetal magnetic force. The electrode potential is proportional to the work required to be done on the charged particles to overcome both the centrifugal force and the electric field around the cathode as the charges accumulate and the potential difference between the electrodes increases. Maximum electrode potential is reached when the centrifugal and repulsive forces are equal to the centripetal force, after which no further charged particles reach the electrode. The radius of the electrode determines the minimal value voltage between the central and an outer electrode: as the central electrode radius is reduced (by sputtering or erosion) the centrifugal force increases, reducing the number of charged particles which can reach the central electrode and therefore the electrode potential, for a given field strength and particle speed. The difference in mass between ions and lighter charged particles, such as electrons, results in different centrifugal forces for given particle kinetic energies. The generator output and efficiency are optimised when the generator uses the maximum magnetic field to minimise the centrifugal force and to maximise the radial distance over which the force acts for a given field strength. Particles having the highest charge-to-mass ratio should be used.

Low pressure gases can be used as a charge source when ionised by particle collision and excitation within the chamber. Doped gases can minimise the energy level for ionising gas atoms/molecules thereby improving efficiency. However, the resultant magnetic force is lower for the heavier ions due to their lower velocity so that the electric field radiated by the high voltage electrode (cathode) can attract oppositely charged particles (+ ions) and subsequently discharge the electrode reducing the output voltage. Various methods can be used to overcome or reduce this effect. For example one method would be to separate the opposite charges and/or to use electrical biased grids to control the flow of opposite charges to the high voltage electrode.

Gaseous systems are generally more complex than single charge systems, providing higher currents at lower voltages, whereas single charge systems, for example electrons used in high vacuum chambers, can generate higher voltages.

The magnetic field can be from one or more permanent magnets and/or from one or more electromagnets; a static magnetic field produces a constant output voltage, while a varying field produces a varying voltage for particles with equal mass and velocity.

An external source is used to accelerate the charged particles to give them initial kinetic energy, which is released as heat when the particles collide with the electrode. When the energy represented by the increased voltage between the electrodes is greater than the energy required to provide the charged particles; and accelerate them, the conversion process is self-sustaining, the output energy being the difference between the sum of the kinetic energy lost and the energy generated. Charge flows from the central electrode via an external load to another electrode. The electrical energy (work) released is a function of the current (sum of charges that flow per second) times the potential difference. Electrical and thermal output can be controlled by varying: the field strength; the particle speed; the particle density (mean free path), and/or by incorporating a grid to control the rate at which particles reach the central electrode. The output is also proportional to the heat lost or gained, since the translational energy of the particle is proportional to its temperature. Heat liberated at the electrode can be returned to the particles to maintain their energy, or be utilised in a heat exchanger for external use. The generator normally uses non-reacting conductive material to prevent chemical reaction by gases, coolants etc. with the electrodes, container walls or other components. Various particle trajectories, directional movements and positioning of the orbiting particles can be used with appropriate magnetic fields. The low-pressure gas can be ionised by any suitable means: one method would be to use an electron-/ion gun where the plane and direction of the injected particles is correct for the applied magnetic field. In gas apparatus, the electrons flowing through the external circuit, on reaching the anode, recombine with a gaseous ion to form a neutral gas atom/molecule. This atomic particle is duly re-ionised by collision and/or the electric fields, the energy being directly or indirectly derived from the work done by the resultant force acting on the charged particles.

In order that the invention may be better understood, it will now be described with reference to the accompanying schematic drawings, which are given by way of example, and in which:

FIG. 2 shows an axial cross-section of one type of apparatus for the invention, using permanent magnets; and a grid controlling ion migration to the cathode.

FIG. 3 shows a cross-section of the apparatus of FIG. 2 along the line A—A;

Figure 1:
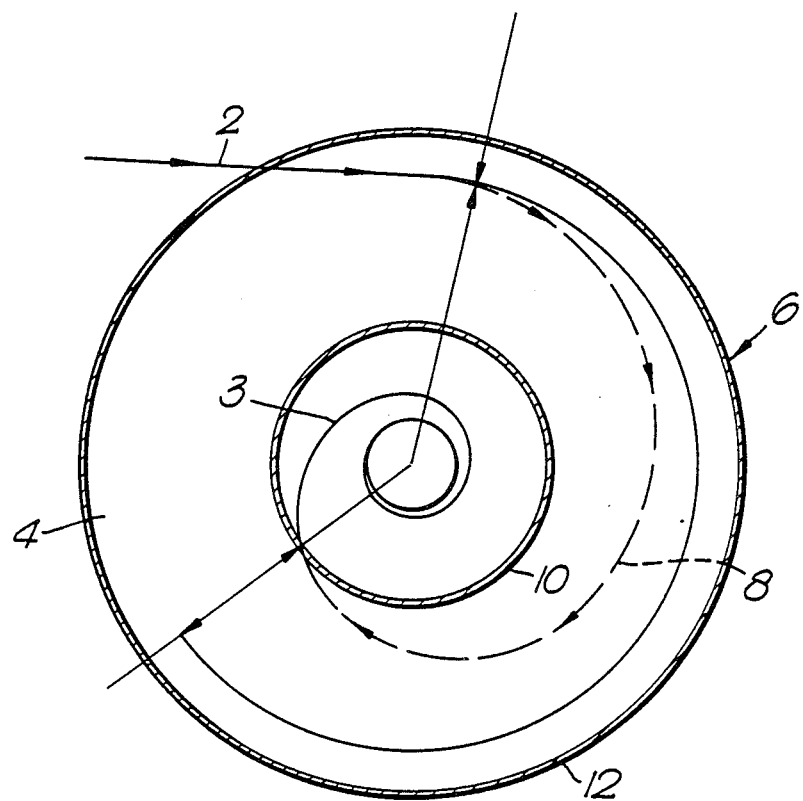
FIG. 1 shows schematically a cross-section of the generator; and the path followed by a particle during the energy-conversion process.

As shown in FIG. 1, a charged particle is injected along a trajectory 2 into a magnetic field extending normal to the plane of the drawing. The field permeates the space 4 of the annular cross-section within a cylindrical chamber 6. The magnetic field produces on the particle a force extending normally to both its direction of motion and the magnetic field. The resultant centripetal force causes the particle to follow a spiral path 8 ending on the central electrode 10 spaced radially inwards from the outer cylindrical electrode 12. The extra energy acquired by the particle is a function of the radial distance travelled and the strength of the magnetic field between the electrodes. This energy is given up on impact with the central electrode, in the form of heat and/or work done in bringing the charge against the opposing electric field to the electrode. In the absence of the central electrode 10, the electrons would follow the orbit of equilibrium 3, this being the orbit followed by a particle when the centrifugal and centripetal forces balance, resulting in no work being done on the particle.

As shown more particularly in FIGS. 2 and 3, the energy converter 1 consists basically of a annular chamber 6 having an outer cylindrical electrode 12; an inner cylindrical electrode 10, and two gas-tight walls 14 of electrical insulation material. In the electrode 12 is a port 22 through which an electron gun 20 can inject electrons into space 4. Additionally or alternatively, an ion gun 18 can inject positively-charged particles through port 16.

Seated on the major flat surfaces of chamber 6 are magnetic pole-pieces 24 giving rise to a uniform magnetic field 80 which traverses the space 4 parallel with the axis of chamber 6. The magnets may be ceramic permanent magnets, or they may be electromagnets. In either case, means (not shown) may be provided for adjusting the magnetic field strength.

Heavy conductors 26 connect the two electrodes to terminals 28 across which a resistive load can be placed to dissipate the generator output.

A vacuum pump (not shown) has its inlet in communication with the interior of chamber 6 so that the gas pressure in the generator can be reduced to, and kept at, a desired sub-atmospheric value. Associated with the pump, or separate therefrom, may be means for ensuring that the gas in the generator is of a desired composition, for instance, one which enhances the possibility of ionising collisions between the charged particles and gas atoms or molecules. One such suitable gas would be neon containing 0.1% argon by volume.

In order to cause the generator to start working, it is necessary to start the vacuum pump and to energise the or each particle source. The latter involves heating a filament from an external source of power until the required internal energy level (temperature) is reached which in turn causes a piece of thermo-emissive material to emit electrons. If the electrons are to be the charge carriers, they are accelerated by a suitable electric field and projected into the space 4. Here they are further accelerated by the radial electric field between the electrodes, and at the same time have a deflecting force applied to them by the axial magnetic field through which they pass.

For an ion source, the electrons are accelerated until they impact some atoms or molecules, to produce a stream of ions which likewise pass into the space 4. With the polarities shown, the electrons are attracted to the central electrode, while the ions are pulled towards the outer electrode, which accounts for the different orientations of sources 18 and 20.

Any gas molecule which pass close to, or between, the electrodes are ionised by collision and/or the electrostatic field. Output current can then be taken through a load impedance connected across terminals 28. The impedance is matched to prevent the internal process energy dropping below a value which would prevent the reionisation of the gaseous atoms. As each ion is deionised at the anode, the gas atoms will tend to continue to circulate until reionised, the resultant force drawing both the ions (shown by solid circles) and electrons (shown by hollow circles) back into their respective orbits.

It is envisaged that, in the case of a converter using electrons, the chamber could be evacuated to a chosen subatmospheric pressure and sealed.

Figure 4:
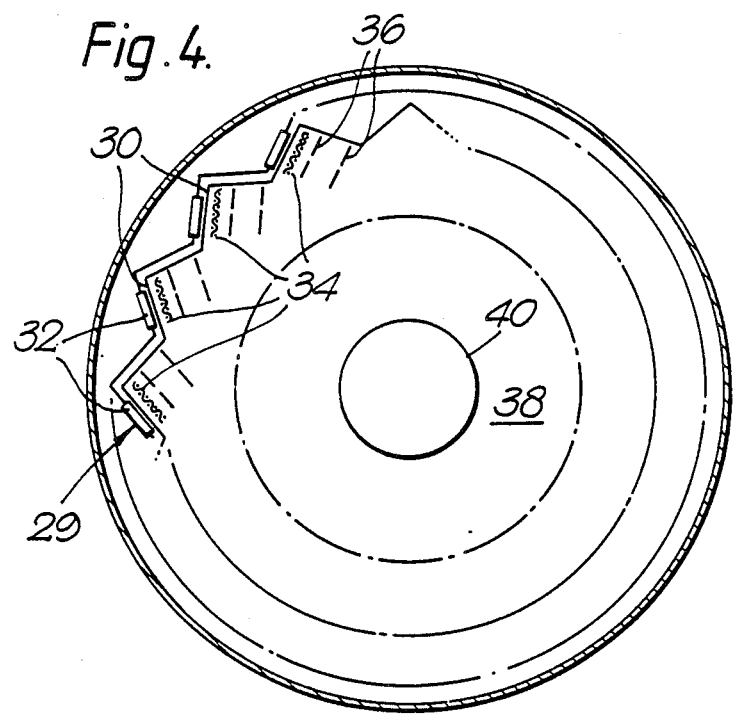
FIG. 4 is a diagrammatic section through one form of converter using electrons, showing a circular series of electron sources.

In that form of the invention shown in FIG. 4, each electron source forming one of a circular series 29 of sources has a body 30 of electroemissive material, such as molybdenum coated by caesium, heated by an electric filament 32 connected in series or parallel across a source of electric power (not shown). Immediately in front of each emitter 30 is a grid 34 of fine wires, all the grids being connected with a source of adjustable voltage so as to control the flow of electrons from the emitter. These electrons are projected through one or more acceleration electrodes 36 across which a potential difference is established along the electron path, so that each incremental electron source injects a stream of electrons having known kinetic energy into a space 38, indicated by the circle shown in a broken line, traversed by the deflection magnetic field, within which is the central, target, electrode 40. The stream of electrons injected into the magnetic field may be focussed by electric and/or magnetic fields.

In the remaining Figs, those parts already referred to will retain the same references.

Figure 5:
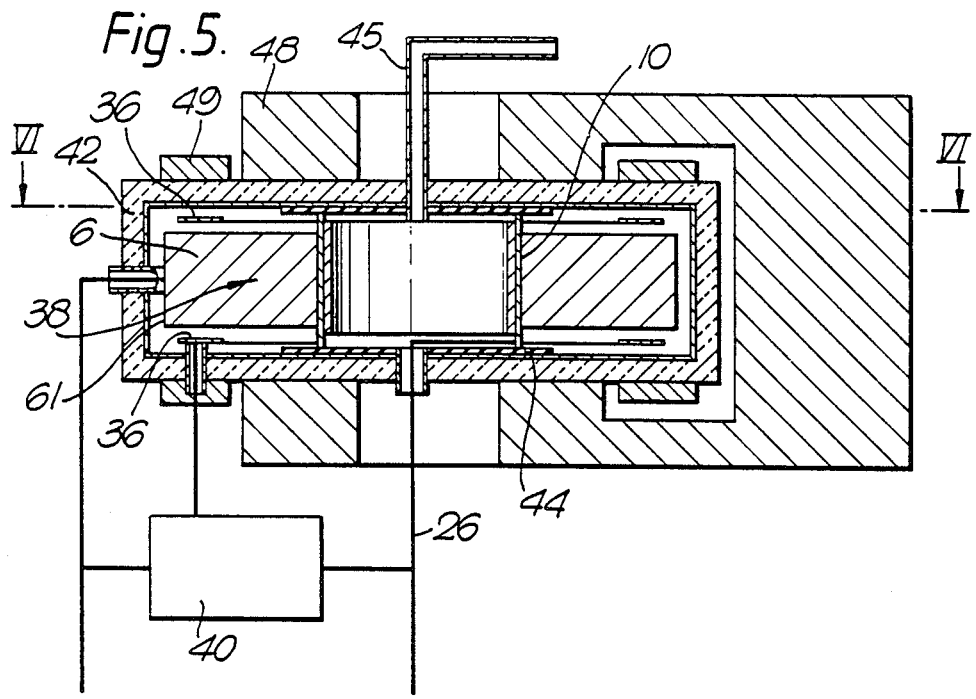
FIG. 5 is an axial cross-section through a morepractical embodiment of the FIG. 4 converter.

In the "flat disc" configuration shown in FIG. 5, the annular chamber 6 is enclosed in a body 42 of thermal insulation material. The central electrode 10 is seated on insulators 44 which are pierced by conduits 45 for the passage of a coolant fluid and by an output lead 26, which may extend along the conduit so that it too is cooled.

FIG. 5 shows how the deflection magnet is generally U-shaped, and has two annular pole-pieces 48, so that the magnetic field is uniform between the surface of electrode 10 and the region 38 radially innermost of the circular electron source, the electric field between the electrode 36 and emission surface 61 providing the electrons initial accelerations (kinetic energy).

FIG. 5 also shows how a voltage is tapped off the resistive load 40 (which thus functions as a potentiometer) and is fed through to the acceleration electrode 36.

Chamber 6 is also provided with two annular magnets 49 (or a circular series of incremental magnets) designed to influence the direction along which the electrons pass into space 38. The magnets provide local magnetic fields to ensure that the electrons meet the boundary of space 38 tangentially, i.e. with zero radial velocity.

Figure 6:
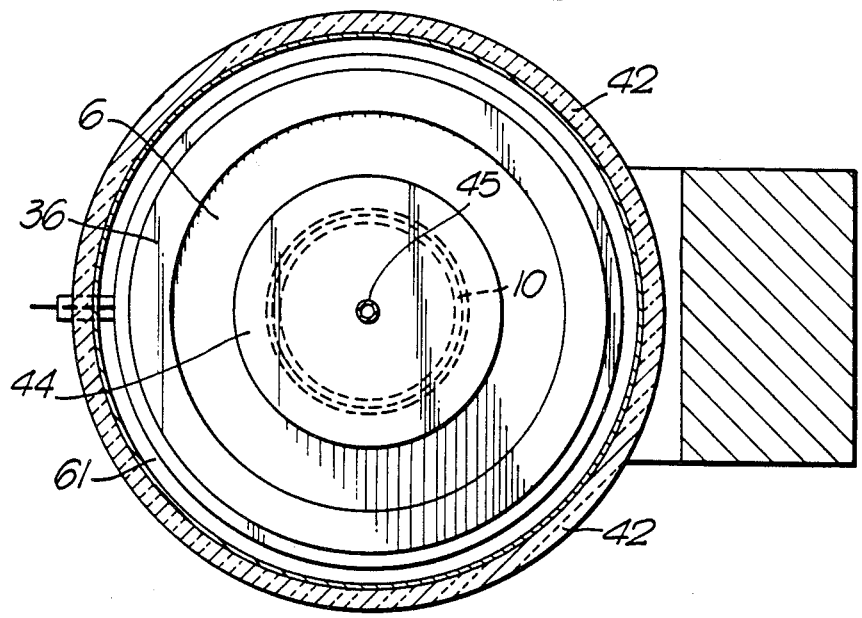
FIG. 6 is a section along the line VI—VI of FIG. 5.
Figure 7:
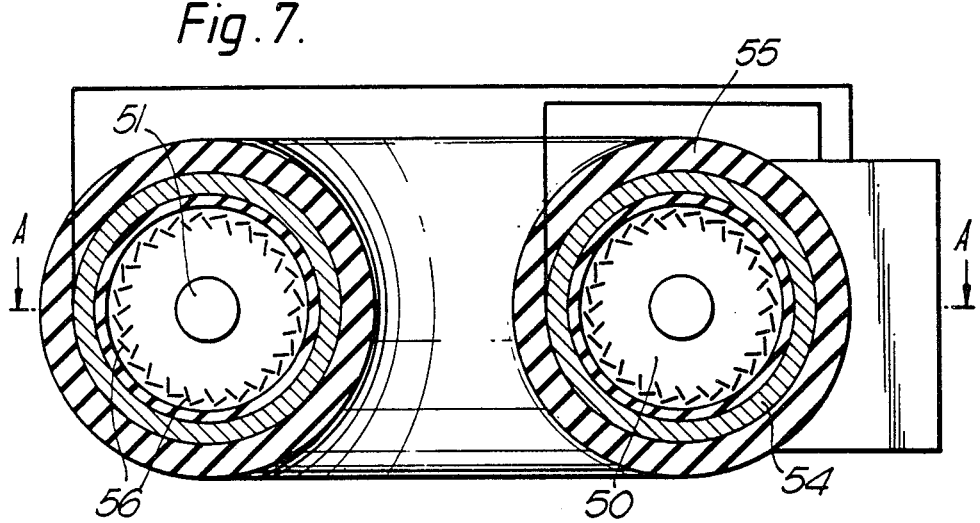
FIG. 7 is a cross-section along a diameter of a doughnutshaped (toroidal) high-power converter.
Figure 8:
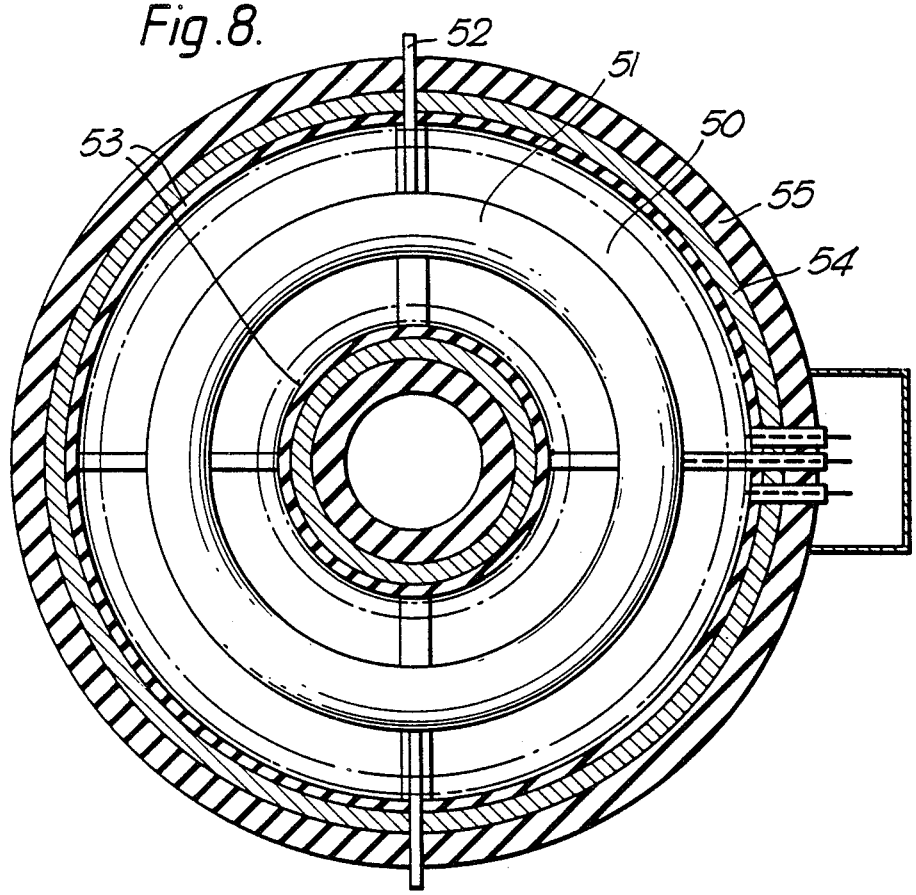
FIG. 8 is a section on line A—A of FIG. 7.

In that form of the invention shown in FIGS. 7 and 8, the individual "flat disc" converters of FIGS. 5 and 6 are arranged in a type of "circular" construction, such that the magnetic fields extend along the axis of the resulting toroidal space 50 penetrated by a single toroidal target electrode 51 through which a coolant fluid may pass, along conduits 52. The cross-section of FIG. 8 shows that the magnetic fields are supplemented by an electric field produced by windings 53 wound on a magnetic core 54 bounded by insulation 55.

Apart from the fact that the electrodes are common to all converters, each functions individually as described above. Obviously the power source driving the heaters for the electron guns 56; the electromagnets (if any); the acceleration electrodes and the control grids, have to be of sufficient capacity to supply the greater power needed to drive this "toroidal" configuration. Concomitant changes would need to be made to the physical dimensioning and positioning of the relatively-complex construction, but as all these are within the purview of a competent engineer, they are not further described in this specification.

Figure 9:
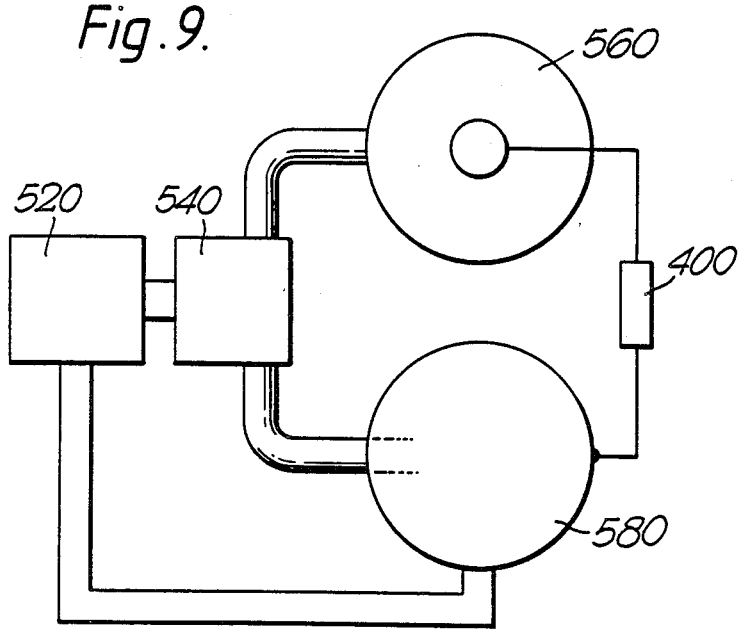
FIG. 9 is a scheme of a two-stage converter, using both forms of charged particles concurrently.

As already mentioned, the converters of this invention are of two types, i.e. electronic and ionic. FIG. 9 shows diagrammatically how they may be combined to take advantage of their differences. In the two-stage power generation apparatus shown in FIG. 9 the first stage consists of an ioniser 520 supplying a mixture of charged particles, i.e. ions and electrons, to a separator 540, which supplies electrons to a second stage consisting of a sealed electronic converter 560 in parallel with a gaseous ionic converter 580.

The separator 540 may use the different particle masses to separate them centrifugally using, for example, the energy conversion system of FIG. 1 (without the target electrode), or it may use electromagnetic deflection fields, or a physical diffusion process, either alone or in combination. As this is not part of the subject-matter of this invention, it will not be described herein in any further detail.

In the generators of FIGS. 6 and 8, the respective particles are deflected magnetically and accelerated radially, to function as already described above.

Because each generator is designed to operate most effectively with its particular form of charge carrier, it can be designed optimally, thus reducing the energy absorption caused by ions and electrons recombining before each has fallen on its respective target electrode. Because the electronic converter would finish up with a negatively-charged electrode, whereas the converse is true for the ionic converter, the load 400 extracting energy from the apparatus is connected across the two target electrodes. The other two electrodes of the converters may be held at the same potential, as by being connected together, or their potentials may float.

The generator can be designed to produce a wide range of output voltages and currents. The lower-energy generators are light enough to be mobile, so that they can power vehicles or act as stand-by generators. Various electrode and magnet configurations can be used, and the generators can be connected in series or parallel. Cooling jackets are fitted to prevent overheating in high-powered apparatus, and the generator is enclosed within a thermally-insulating jacket to reduce heat losses thereby increasing particle velocities. For high-energy generators, it may be necessary to provide for forced cooling of the inner electrode, as by fins projecting therefrom into a high-speed stream of suitable coolant.

Although the process according to this invention is particularly suited to using external electrical energy, it must be understood that other sources can be used to provide the initial energy input, e.g. solar and waste-procesed heat are some of the varied energy sources which could be utilised. Control of the charge-generation process can be achieved by other means, including one or more electrically-biased grids, as used in thermionic valves.

I claim:

1. An energy conversion process for generating an electric potential, the process comprising; providing a source of electric charge carriers of predetermined polarity, accelerating the carriers away from the source, introducing the carriers into a magnetic field transverse to the path of the carriers in a process chamber, the field bounding an inner electrode within the chamber such that the carriers orbit the electrode while accelerating radially toward the electrode; and converting the resulting increased kinetic energy of the carriers into an electric potential at the electrode before the carriers reach an orbit of equilibrium in which the centripetal force is balanced by the centrifugal force on the carriers.

2. A process according to claim 1 in which the electric potential is created between the inner electrode and an outer electrode radially spaced from the inner electrode.

3. A process according to claim 2 in which the outer electrode provides the said source of the charge carriers.

4. A process according to claim 1 or claim 2 in which the chamber is maintained at a sub-atmospheric pressure.

5. A process according to claim 1 in which the electric potential drives a load connected between the inner electrode and a point remote from the electrode.

6. A process according to claim 1 or claim 2 in which the electric charge carriers comprise electrons or ions.

7. A process according to claim 1 in which further charge carriers of the opposite polarity traverse the magnetic field and accumulate at a second electrode to increase the potential difference between the two electrodes.

8. A process according to claim 1 in which electrically biased grids control the flow of the charge carriers from the source.

9. A process according to claim 1 in which the charge carriers are separated from charge carriers of the opposite polarity before being introduced into the magnetic field.

10. A process according to claim 9 in which the charge carriers of opposite polarity are introduced into a corresponding second magnetic field, whereby a potential difference is produced between respective electrodes in each field.

11. A process according to claim 1 in which the carriers are injected into the magnetic field.

12. A process according to claim 11 in which the injection energy is produced by accelerating the carriers through an electric field.

13. A process according to claim 11 in which the injection energy is produced by accelerating the carriers through a magnetic field.

14. A process according to claim 1 in which the injection energy of the carriers is produced by nuclear emission.

15. A process according to claim 1 in which the injection energy of the carriers is produced by heat.

16. A process according to claim 1 in which the generated electric potential is directly or indirectly used to maintain the generation of charge carriers or the internal temperature of the space traversed by the magnetic field, or the applied magnetic field.

17. A process according to claim 1 in which the generated electric potential is directly or indirectly used to maintain the generation of charge carriers and the internal temperature of the space traversed by the magnetic field and the applied magnetic field.

18. An energy converter including a source of electric charge carriers of a predetermined polarity, a process chamber having an inner electrode, means for accelerating the carriers away from the source and for introducing the carriers into the chamber, means for applying a magnetic field transverse to the path of the carriers and bounding the inner electrode of the chamber such that the carriers orbit the electrode while accelerating radially toward the electrode, the electrode being located at a radius which exceeds the equilibrium radius for the carrier mean velocity and applied field strength and intercepting the carriers such that the increased kinetic energy of the carriers due to centripetal acceleration is converted to an electric potential at the electrode.

19. An energy converter according to claim 18 in which the chamber includes an outer electrode spaced radially from the inner electrode, and means for injecting the charge carriers into the space between the electrodes.

20. An energy converter according to claim 19 in which the outer electrode provides the said source of charge carriers.

21. An energy converter according to claim 19 further comprising an insulating wall bounding the outer electrode.

22. A converter according to claim 18 further comprising means for maintaining the chamber at a predetermined sub-atmospheric pressure.

23. A converter according to claim 19 in which the outer electrode has at least one port through which the charge carriers can be injected into the chamber along a desired trajectory.

24. A converter according to claim 23 in which the outer electrode has plural ports and each port communicates with a thermionic source of the respective carriers.

25. A converter according to claim 18 in which the chamber is a vacuum chamber.

26. A converter according to claim 18 further comprising electrically biased grids for controlling the flow of charge carriers from the source.

27. A converter according to claim 22 or claim 25 in which the evacuated chamber comprises a sealed unit.

28. A converter according to claim 18 further comprising means for adjusting the strength of the applied magnetic field.

29. A converter according to claim 18 in which the chamber is filled with low pressure gas.

* * * * *